Dec. 2, 1958

J. P. MILLER ET AL 2,862,459

RAILWAY VEHICLE TRUCK

Filed June 20, 1955

INVENTORS
Joseph P. Miller,
George E. Rasmussen,
C. Hugo Patzie
BY
S. C. Thorpe
ATTORNEY Dec. 2, 1958         J. P. MILLER ET AL         2,862,459
                     RAILWAY VEHICLE TRUCK
Filed June 20, 1955                          3 Sheets-Sheet 2
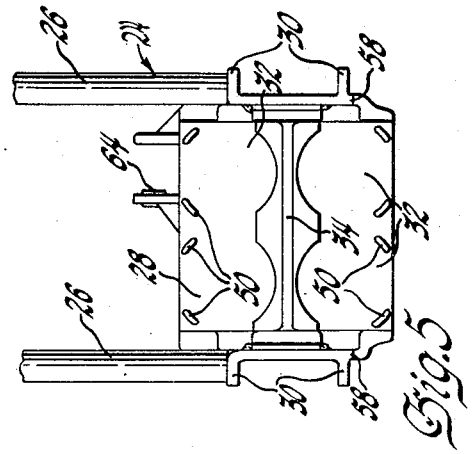
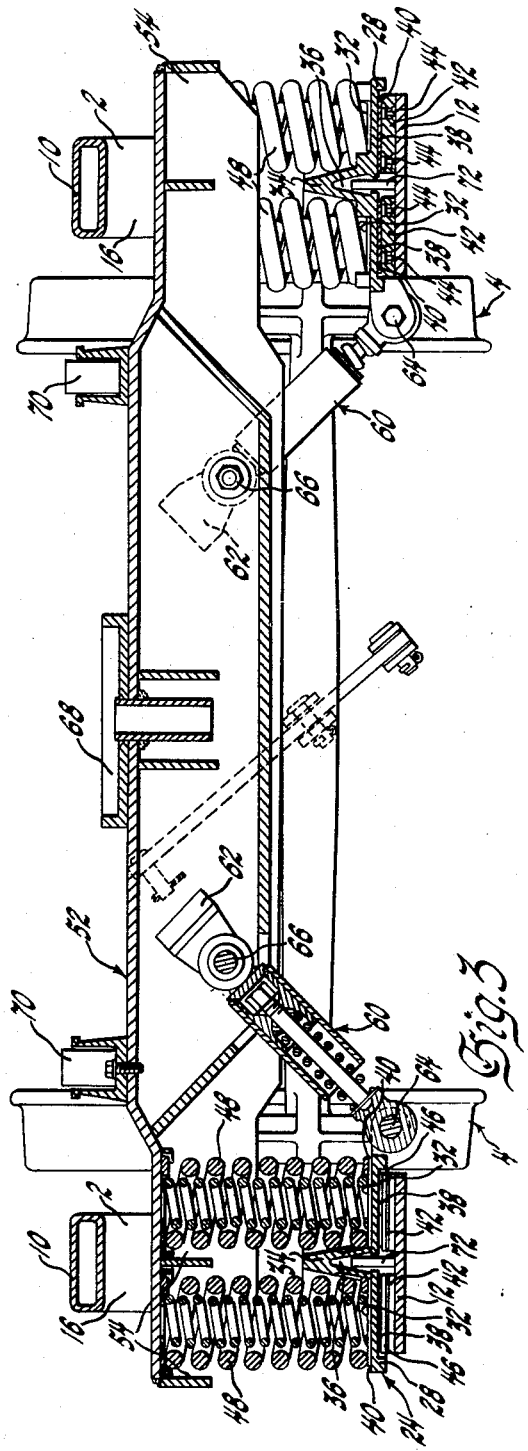
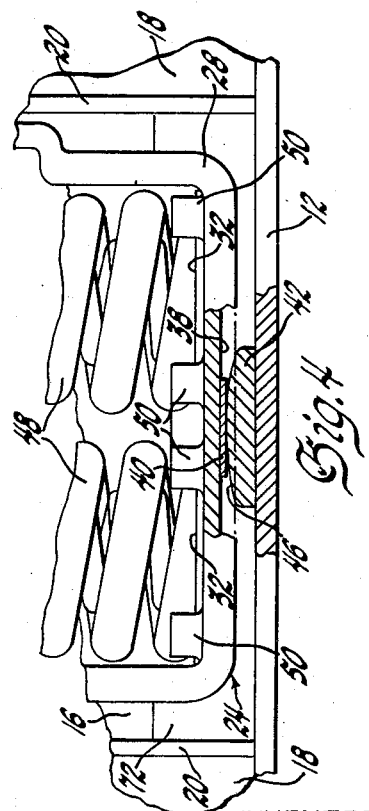
INVENTORS
Joseph P. Miller,
George E. Rasmussen,&
BY C. Hugo Patrie
J. C. Thorpe
ATTORNEY Dec. 2, 1958   J. P. MILLER ET AL   2,862,459
RAILWAY VEHICLE TRUCK Filed June 20, 1955   3 Sheets-Sheet 3

INVENTORS
Joseph P. Miller,
George E. Rasmussen,
C. Hugo Patrie
BY J. C. Thorpe
ATTORNEY United States Patent Office 2,862,459
Patented Dec. 2, 1958

2,862,459

RAILWAY VEHICLE TRUCK

Joseph P. Miller, Hinsdale, George E. Rasmussen, Chicago, and Clarence Hugo Patrie, La Grange, Ill., assignors to General Motors Corporation, Detroit, Mich., a corporation of Delaware Application June 20, 1955, Serial No. 516,384

4 Claims. (Cl. 105—187)

This invention relates generally to railway vehicle trucks and more particularly to high-speed passenger and freight car trucks of the swinging bolster type.

It is generally recognized that the railway vehicle truck utilizing a swinging bolster which is suitably damped provides a superior ride for the vehicle bodies supported thereby because not only is the load cushioned vertically but the tendency on the part of the springs to re-center the bolster when it is displaced laterally also improves the "lateral ride" of the truck. In the ordinary four-wheel freight and passenger car truck, however, it is usual to provide side frames which are not rigidly connected together by transom members and consequently this type of truck does not lend itself to the use of the laterally swinging bolster as well as the rigid type of truck frame normally used under locomotives. One reason for making freight and passenger car trucks so that the side frames can move some extent relative to each other is to provide the truck with flexibility which will better enable it to absorb irregularities in the track and prevent the transmittal of shock loads caused thereby to the vehicles carried by these trucks. Another reason is one of cost, since truck frames comprising longitudinally extending side frame members and transversely extending transom members rigidly connected together are more expensive to cast or otherwise fabricate. Also with the four-wheel type truck in which a rigid frame is employed, difficulties of assembling and disassembling the bolster and the bolster springs are encountered.

It is therefore broadly an object of this invention to provide an improved high-speed four-wheel freight and passenger car truck which has the superior vertical and lateral ride characteristics obtained with the swinging bolster while at the same time maintaining the flexibility and the cheapness of construction of trucks in which the side frames are not rigidly fixed together.

It is a further object of this invention to provide an improved high-speed four-wheel freight and passenger car truck which, in addition to the above, is easy to assemble and disassemble for servicing and repair.

A narrower but important object of the invention is to provide a composite bolster and transom frame assembly capable of being assembled and removed as a unit.

Another object of this invention is to provide means which enable this composite assembly to roll in a restricted manner so as to provide increased flexibility between the side frames of the truck and thereby further improve the ride thereof.

In combination with the above it is also an object of this invention to provide means for restricting transverse movement of the transom assembly to limited amounts relative to the side frames and, further, to provide means for limiting lateral swinging movement of the bolster relative to the transom frame assembly.

For a full understanding of this invention and the above and further objects thereof reference may be had to the accompanying detailed description and drawings, in which:

Figure 3 is an end view in section taken on the line 3—3 of Figure 2 among other features illustrating the unique friction snubbers extending between the transverse transom frame assembly and the bolster and the novel manner of attachment.

Figure 4 is an enlarged view of a portion of Figure 2 with parts broken away and in section to illustrate how the spring supports forming a part of the transom frame assembly are supported on the tension members of the side frames so as to roll with respect thereto.

Figure 5 is an enlarged view in plan of one end of the transom frame assembly including the unique spring supports and the longitudinally extending abutments which embrace the sides defining the windows in the side frame members.

Figure 1:
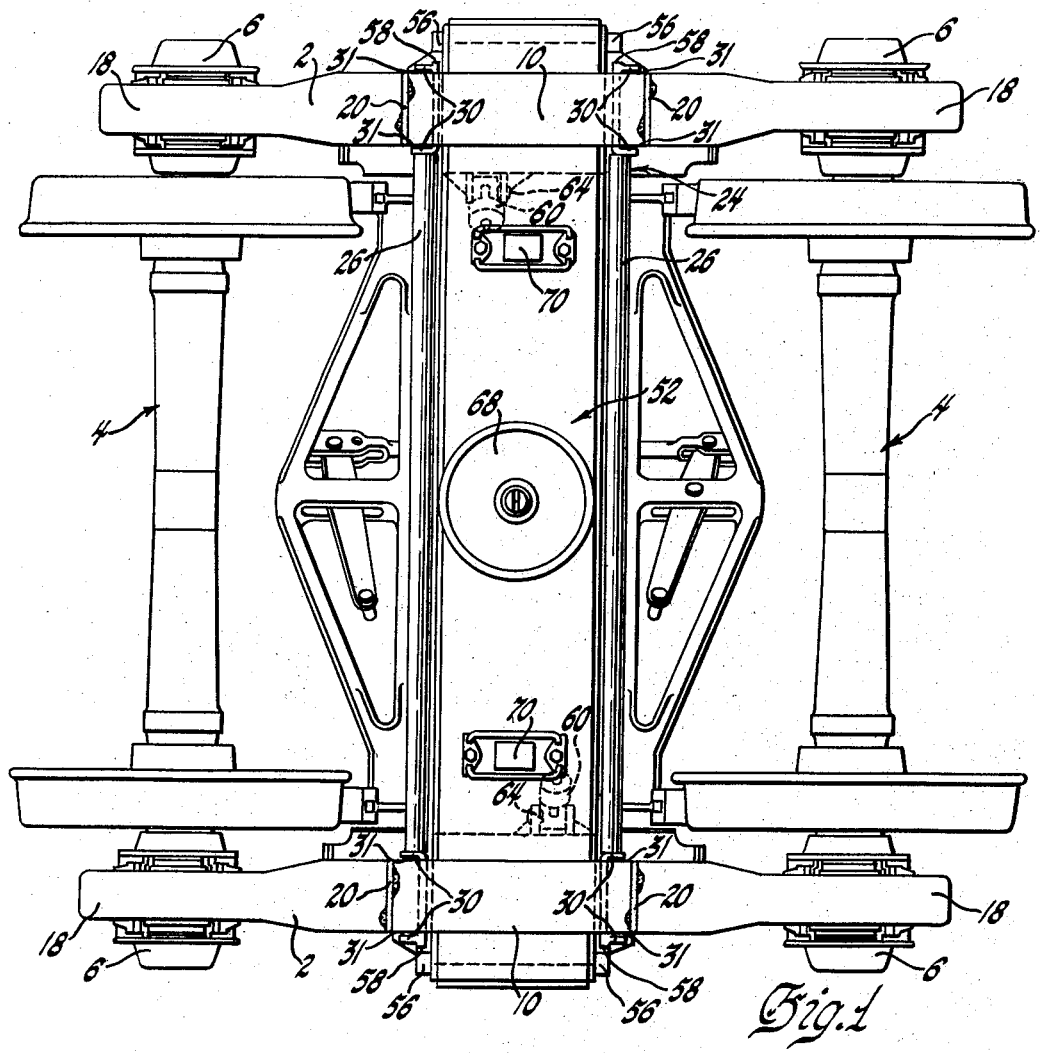
Figure 1 is a view in plan of the novel truck illustrating broadly the various features of the invention.
Figure 2:
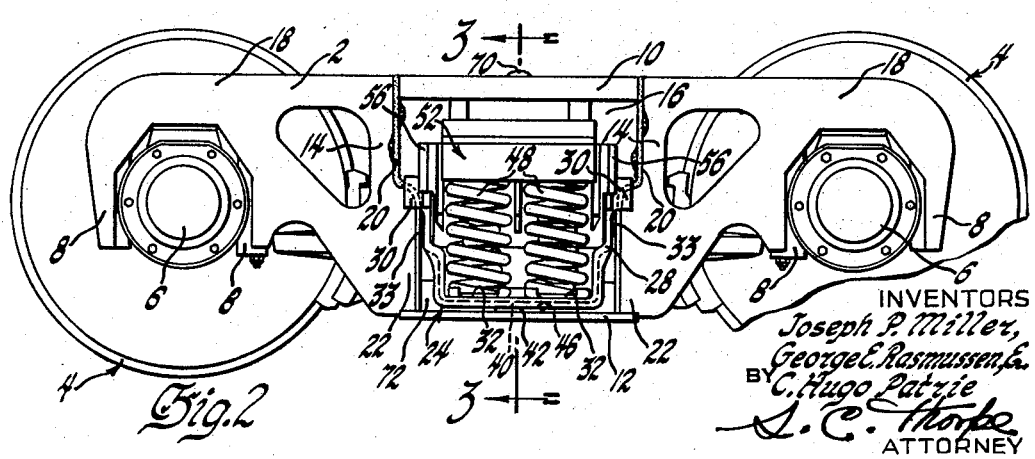
Figure 2 is a view in elevation of one side of the truck showing the manner of nesting the transom frame assembly in the windows of the side frames and resiliently supporting the bolster for lateral swinging movement on the transom frame assembly.
Figure 7:
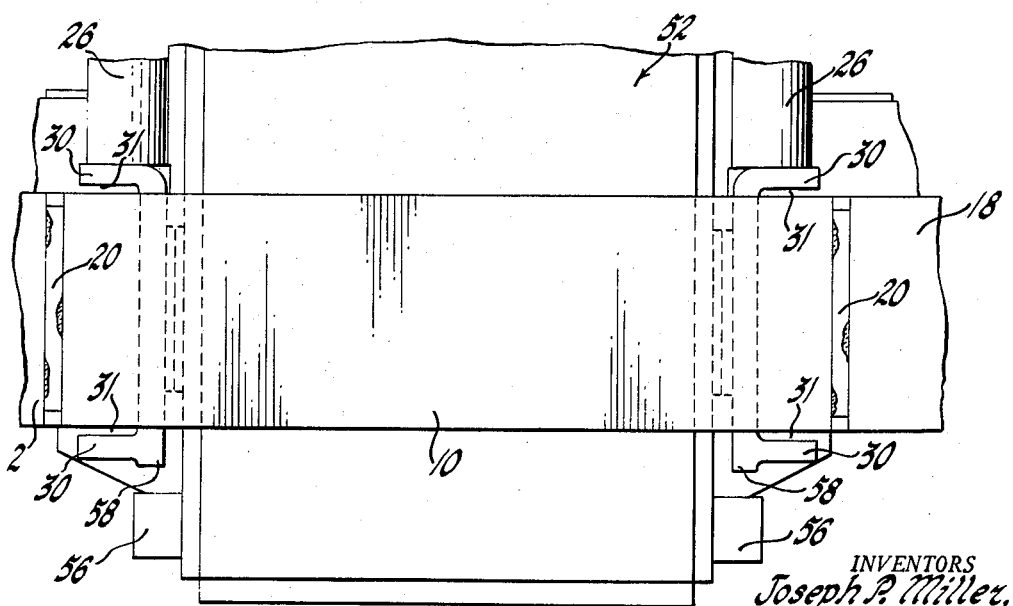
Figure 7 is an enlarged fragmentary view of a portion of Figure 1 showing certain clearances and other details.

Referring to the drawings, the railway vehicle truck comprises a pair of transversely spaced, longitudinally extending side frames 2 supported adjacent the ends thereof and to some extent maintained in tram by the wheel and axle sets, indicated generally by numerals 4, and the journal box assemblies 6 received between oppositely disposed pedestal sets 8. The side frames 2 comprise an upper compression member 10, a lower tension member 12 and a pair of oppositely disposed posts or pillars 14 defining windows 16 located intermediate the ends of these side frames. Actually, the side frames are fabricated in a novel manner by forming identical side frame ends 18 which are suitably connected together, preferably by welding the compression members 10 and the tension members 12 therebetween. The posts 14 are reinforced by means of laterally extending, generally vertical plates 20 welded or otherwise secured thereto. It will be observed, however, particularly in Figure 2 that the longitudinally center-facing surfaces of the posts 14 are provided with longitudinal center-facing projections 22 which extend from the tension member 12 approximately halfway up toward the compression member 10. The purpose of these projections and the reason for extending them only partially upward toward the compression member 10 will appear shortly. Extending transversely of the truck and into the windows 16 are the ends of a collar arrangement, in this instance called a transom frame assembly and indicated generally by a numeral 24 for purposes of the description and the claims. This transom frame assembly 24 comprises a pair of longitudinally spaced, transversely extending tubular members 26 having their ends rigidly connected to transversely disposed spring supports 28. The spring supports 28 are provided adjacent the upper side thereof with longitudinally extending abutments or lugs 30 which embrace opposite sides of the projections 22 to thereby restrict lateral movement of the transom frame assembly 24 relative to the side frames 2. It will appear, however, from Figure 7 that there is a limited amount of lateral clearance 31 between the lugs 30 and the projections 22 which enables the frame assembly 24 to move laterally a limited amount in the windows 16.

From the foregoing it may be appreciated that the transom frame assembly 24 tends to maintain tram between the side frames 2 while at the same time retaining the flexibility provided by not having the side frames 2 rigidly connected together. In this respect it should also be observed that there is a slight longitudinal clearance 33 between the longitudinal end-facing surfaces on the spring supports 28 which abut the longitudinal center-facing surfaces on the projections 22 (see Figure 2). The purpose of this clearance will appear shortly.

Figure 6:
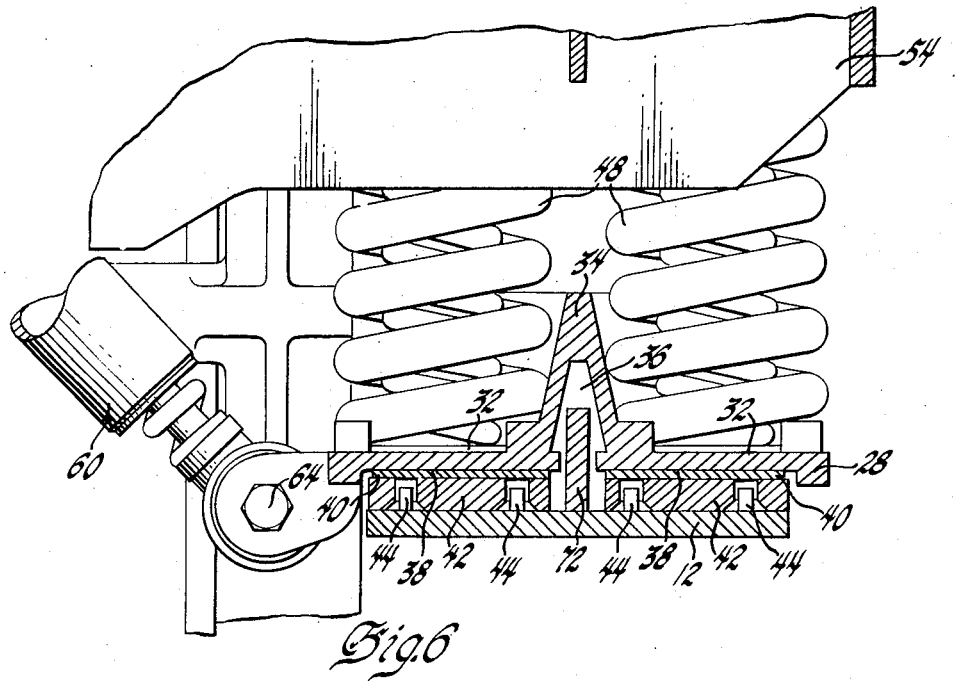
Figure 6 is an enlarged view of a portion of the right side of the assembly as shown in Figure 3 illustrating more clearly certain details thereof.

Each of the spring supports 28 is either cast or otherwise suitably fabricated so as to form four spring seats 32 which, it will be observed, are divided into inner and outer pairs by a longitudinally extending, vertical, upwardly projecting wedge 34 which is provided with a recess or cavity 36 on the underside thereof (see particularly Figure 6). Each spring support 28 is provided with lower surfaces 38 (see Figures 6 and 4) to which are fixed small bearing plates 40. The bearing plates 40 rest on members 42 fixed by studs 44 to the upper side of the tension member 12. Each member 42 is provided with a longitudinally extending, upwardly facing convex surface 46 on which the plates 40 reside. Due to the clearances 33 between the spring supports 28 and the longitudinal center-facing surfaces of the projections 22 the transom frame assembly 24 can roll slightly in the windows 16 of the side frames 2. This further increases the flexibility of the truck and aids in compensating for track irregularities. Seated on the spring seats 32 of the transom frame assembly 24 are sets of bolster spring assemblies 48. These spring assemblies have their lower ends anchored in the spring seats by the small projections 50 so that the lower ends of these springs tend to remain parallel with the upwardly facing surfaces of the seats thereby preventing any shifting of these ends with respect to the spring supports 28. Supported on the bolster spring sets 48 is a railway vehicle truck bolster indicated generally by a numeral 52. The bolster 52 is provided with spring pockets 54 adjacent the ends thereof in which reside the upper ends of the spring sets 48. These upper ends also have their ends anchored in the pockets 54 so that the ends cannot shift relative thereto and are maintained parallel to the base surfaces forming these pockets.

With the construction just described it will be appreciated that the bolster 52 is free to move or "swing" laterally in the windows 16 with respect to the side frames 2. While a certain amount of this lateral swinging is desirable, too much will render the bolster somewhat unstable on the spring sets 48. To prevent this instability limit stops 56 have been provided on the ends of the bolster (see Figures 7 and 2) which abut cooperating stops 58 adjacent the outer of the longitudinally extending abutments 30.

The use of helical coil spring sets like the ones 48 tends to set up repeating motions in both the vertical and the horizontal directions. To damp these repeated movements friction snubbers, generally indicated by numerals 60, are provided which act between the lower portions of the spring supports 28 inboard thereof and suitable brackets 62 fixed to the bolster 52. It will be seen that these friction snubbers extend laterally and are inclined so as to damp both vertical and horizontal swinging movement of the bolster relative to the side frames and the transom frame assembly 24. The snubbers 60, however, are articulated as shown at 64 and 66 so as to maintain the required flexibility between the bolster and the side frames which is deemed to give the superior ride.

The bolster 52 is provided with the usual center bearing 68 and the rolling limiting devices 70 which support and stabilize one end of a railway vehicle.

It will be noted that if the transom frame assembly is lifted, i. e., moved vertically relative to the bolster 52, so as to compress the spring sets 48 the longitudinally extending abutments 30 will be carried above projections 22 and the bolster and the transom frame assembly, including the springs 48 and friction snubbers 60, may be removed as a composite unit through one of the windows 16 or, if preferred, one of the side frames can be removed.

Another thing to be noted is that the composite unit just mentioned may slide or move to a slight extent on the convex surfaces 46 due to the presence of the clearance 31, a feature which also aids in improving the ride of the truck. To limit this lateral movement of the composite assembly relative to the side frames 2 vertical, longitudinally extending plates 72 are provided on the tension members 12. These plates 72 extend upwardly into the cavities or grooves 36 and tend to limit lateral movement of the lower portions of the spring supports 28.

From the foregoing description it may now be appreciated that a novel railway vehicle truck has been provided which retains the feature of a laterally swinging bolster and yet provides flexibility between the side frames of the truck while maintaining tram between these side frames without using a rigid truck frame. Among other features, the truck is extremely easy to assemble and disassemble for maintenance and repair and is provided with a novel transom frame assembly and spring bolster arrangement which by itself forms a composite assembly capable of being assembled and removed as a unit.

What we claim is:

1. A railway vehicle truck comprising a pair of oppositely disposed side frames having upper compression and lower tension members and vertical posts defining windows therein intermediate the ends thereof, wheel and axle sets supporting said side frames adjacent the ends thereof, a transverse transom frame assembly extending through said windows and supported on said tension members and having bolster spring supports adjacent opposite ends thereof, longitudinally extending abutments on said transom frame assembly engageable with opposite sides of said posts to restrict transverse movement of said transom frame assembly relative to said side frames and to maintain tram between said side frames, bolster springs seated on said supports, a bolster resiliently supported on said springs for lateral swinging movement relative to said transom frame assembly and said side frames, and limit stops on said bolster abuttable with said transom frame assembly to limit lateral swinging of said bolster relative to said transom frame assembly.

2. A railway vehicle truck comprising a pair of oppositely disposed side frames having upper compression and lower tension members and vertical posts defining windows therein intermediate the ends thereof, wheel and axle sets supporting said side frames adjacent the ends thereof, a transverse transom frame assembly extending through said windows and supported on said tension members and having bolster spring supports adjacent opposite ends thereof, longitudinally extending abutments on said transom frame assembly engageable with opposite sides of said posts to restrict transverse movement of said transom frame assembly relative to said side frames and to maintain tram between said side frames, bolster springs seated on said supports, a bolster resiliently supported on said springs for lateral and vertical swinging movement relative to said transom frame assembly and said side frames, friction snubbing means connected between said transom frame assembly and said bolster to damp lateral and vertical swinging of said bolster relative to said transom frame assembly and said side frames, and limit stops on said bolster abuttable with said transom frame assembly to limit lateral swinging of said bolster relative to said transom frame assembly.

3. A railway vehicle truck comprising a pair of oppositely disposed side frames having upper compression and lower tension members and vertical posts defining windows therein intermediate the ends thereof, wheel and axle sets supporting said side frames adjacent the ends thereof, a transverse transom frame assembly extending through said windows and slidably supported on said tension members and having bolster spring supports adjacent opposite ends thereof, longitudinally extending abutments on said transom frame assembly engageable with opposite sides of said posts to restrict transverse movement of said transom frame assembly on said supports relative to said side frames and to maintain tram between said side frames, bolster springs seated on said supports, a bolster resiliently supported on said springs for lateral and vertical swinging movement relative to said transom frame assembly and said side frames, friction snubbing means connected between said transom frame assembly and said bolster to damp lateral and vertical swinging of said bolster relative to said transom frame assembly and said side frames, limit stops on said bolster abuttable with said transom frame assembly to limit lateral swinging of said bolster relative to said transom frame assembly, and stops on said lower tension members abuttable by said supports to limit transverse sliding movement of said supports on said tension members relative to said side frame members.

4. A railway vehicle truck comprising a pair of oppositely disposed side frames having upper compression and lower tension members and vertical posts defining windows therein intermediate the ends thereof, wheel and axle sets supporting said side frames adjacent the ends thereof, a transom frame assembly extending transversely between said side frames and including bolster spring supports seated on said tension members in said windows, longitudinally extending abutments on said supports engageable with opposite sides of said posts to restrict transverse movement of said transom frame assembly relative to said side frames, bolster spring assemblies seated on said supports in said windows, a bolster resiliently supported on said springs for lateral swinging movement relative to said transom frame assembly and said side frames, and limit stops on said bolster abuttable with said transom frame assembly to limit lateral swinging movement of said bolster relative to said transom frame assembly.

References Cited in the file of this patent

UNITED STATES PATENTS

| | | |
|---|---|---|
| 710,637 | Vanderbilt | Oct. 7, 1902 |
| 941,515 | Goodspeed | Nov. 30, 1909 |
| 1,141,436 | Turner | June 1, 1915 |
| 1,978,637 | Knipe | Oct. 30, 1934 |
| 2,630,079 | Cottrell | Mar. 3, 1953 |